United States Patent
Buckley et al.

(10) Patent No.: US 7,830,243 B2
(45) Date of Patent: Nov. 9, 2010

(54) DUAL MODE VEHICLE BLIND SPOT SYSTEM

(75) Inventors: Stephen J. Buckley, Novi, MI (US); Michael Bassier, Macomb, MI (US); Paul Zoratti, South Lyon, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 338 days.

(21) Appl. No.: 12/022,191

(22) Filed: Jan. 30, 2008

(65) Prior Publication Data

US 2008/0211644 A1 Sep. 4, 2008

Related U.S. Application Data

(60) Provisional application No. 60/887,870, filed on Feb. 2, 2007.

(51) Int. Cl.
*B60Q 1/00* (2006.01)

(52) U.S. Cl. .................... 340/435; 340/932.2; 340/937; 340/436; 701/301

(58) Field of Classification Search ................. 340/435, 340/932.2, 937, 436; 342/70, 82; 701/301
See application file for complete search history.

(56) References Cited

U.S. PATENT DOCUMENTS

| | | | |
|---|---|---|---|
| 5,521,579 A | 5/1996 | Bernhard | |
| 5,574,426 A | 11/1996 | Shisgal et al. | |
| 5,670,962 A * | 9/1997 | Henderson et al. | 342/70 |
| 5,777,563 A * | 7/1998 | Minissale et al. | 340/903 |
| 5,929,786 A * | 7/1999 | Schofield et al. | 340/903 |
| 6,388,565 B1 | 5/2002 | Bernhard et al. | |
| 6,424,272 B1 | 7/2002 | Gutta et al. | |
| 6,452,534 B1 | 9/2002 | Zoratti et al. | |
| 6,882,287 B2 | 4/2005 | Schofield | |
| 6,925,370 B2 | 8/2005 | Smith et al. | |
| 6,927,677 B2 | 8/2005 | Anderson et al. | |
| 6,947,841 B2 | 9/2005 | Zimmermann et al. | |
| 6,967,568 B2 | 11/2005 | Ervin | |
| 7,552,012 B2 * | 6/2009 | Lehner | 701/301 |
| 2002/0030591 A1 * | 3/2002 | Paranjpe | 340/436 |
| 2004/0196146 A1 | 10/2004 | Harter, Jr. et al. | |
| 2005/0024191 A1 | 2/2005 | Boddy | |
| 2005/0068197 A1 | 3/2005 | Regan | |
| 2006/0082545 A1 | 4/2006 | Choquet et al. | |
| 2006/0119473 A1 * | 6/2006 | Gunderson et al. | 340/435 |
| 2007/0273490 A1 * | 11/2007 | Fuchs et al. | 340/435 |

\* cited by examiner

*Primary Examiner*—Benjamin C Lee
*Assistant Examiner*—Hongmin Fan
(74) *Attorney, Agent, or Firm*—Ralph E. Smith

(57) ABSTRACT

A proximity sensor system for a vehicle in reverse includes a zone detection module. The zone detection module switches a first remote sensor from a first mode corresponding to a near zone rearward of the vehicle to a second mode corresponding to a far zone rearward of the vehicle. The near zone includes an area of coverage wider and shorter in range than an area of coverage of the far zone. A response module responds to first objects in the near zone and selectively responds to second objects in the far zone when the second objects are in motion.

20 Claims, 4 Drawing Sheets

DUAL MODE VEHICLE BLIND SPOT SYSTEM

CROSS REFERENCE TO RELATED APPLICATION

This application claims the benefit of U.S. Provisional Patent Application Ser. No. 60/887,870, filed on Feb. 2, 2007.

FIELD OF THE DISCLOSURE

The present disclosure relates to sensor systems and more particularly to remote sensing systems for vehicles.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Drivers are often required to exercise judgment in the maneuvering of vehicles with respect to other objects that may be stationary or in motion. Such objects may be street signs, pedestrians, or other vehicles. This is particularly apparent when a vehicle is in reverse negotiating a parking space, driveway, and/or when the vehicle is towing a trailer. Although the use of side mirrors can assist, there may be blind spots.

Many vehicles include proximity sensing systems that provide the driver an indication of an object or, more preferably, the proximity of the object that may be obscured by a blind spot. Providing accurate proximity information to the driver may improve vehicle navigation.

SUMMARY OF THE DISCLOSURE

A proximity sensor system for a vehicle in reverse includes a zone detection module. The zone detection module switches a first remote sensor from a first mode corresponding to a near zone rearward of the vehicle to a second mode corresponding to a far zone rearward of the vehicle. The near zone includes an area of coverage wider and shorter in range than an area of coverage of the far zone. A response module responds to first objects in the near zone and selectively responds to second objects in the far zone when the second objects are in motion.

In other features, a control method for a remote sensor system control method for a vehicle includes moving the vehicle in a rearward direction. The method also includes switching first and second remote sensors from near zone detection to far zone detection. The near zone detection includes a wider field of view than the far zone detection. The far zone detection detects areas more distant from the vehicle than the near zone detection.

The method further includes tracking position information for first objects based on the near zone detection and tracking position information for second objects based on the far zone detection. The method still further includes selectively responding to the second objects based on signals indicating that the second objects are moving toward the vehicle. The method also includes responding to all of the first objects. The method still further includes generating a visual alert based on the first and second objects and generating an audible alert based on the first and second objects.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
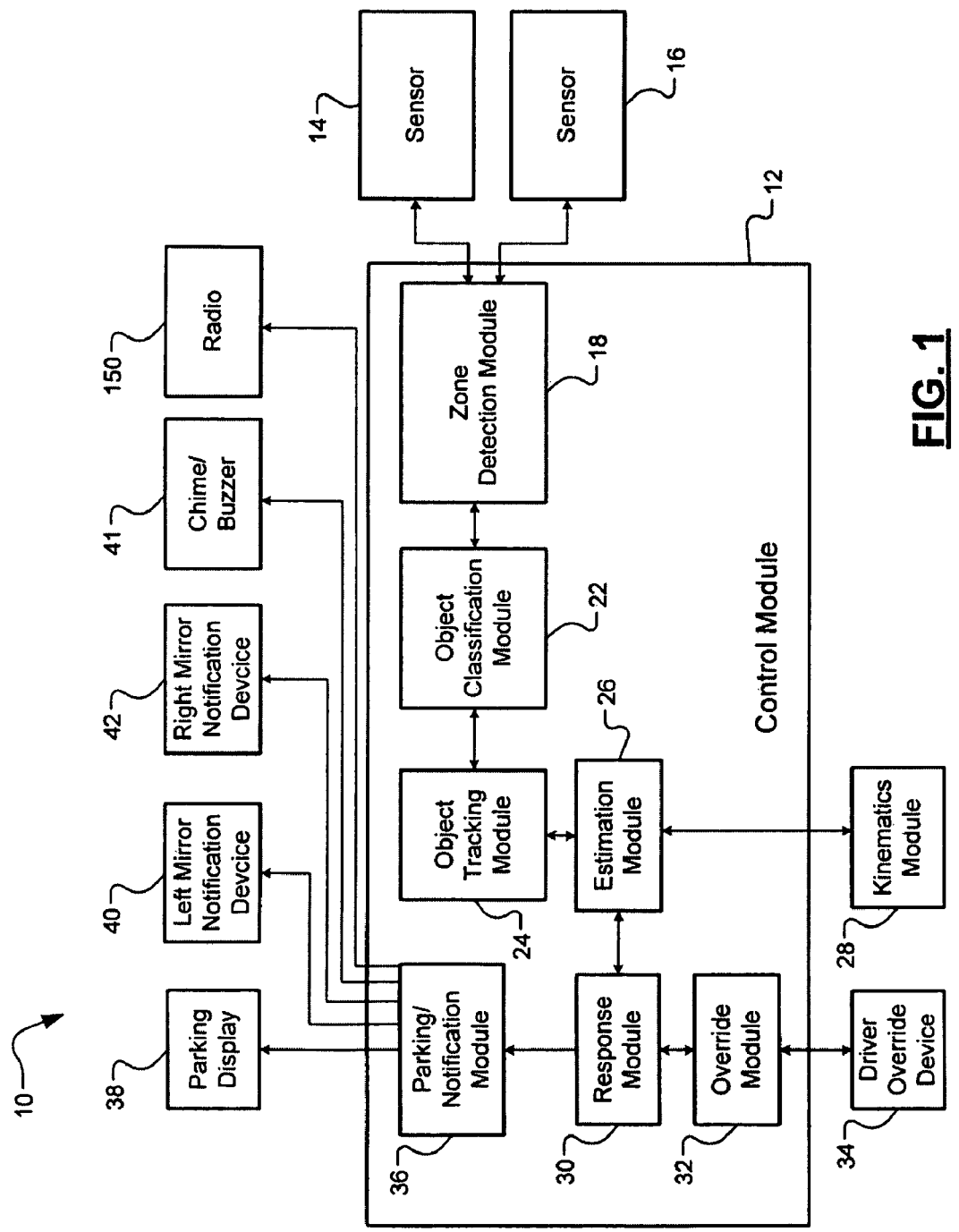
FIG. 1 is a block diagram illustrating a proximity sensor system for a vehicle in accordance with the present disclosure.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure includes a vehicle proximity system that controls remote sensors in near and far modes.

Referring now to FIG. 1. The vehicle proximity system 10 includes a control module 12 that receives remote signals from first and second remote sensors 14, 16 that are coupled to a vehicle. The sensors may, for example, be coupled to a bumper cover surface on sides off the vehicle. A zone detection module 18 of the control module 12 receives remote sensor signals and switches the sensors 14, 16 between near zone detection modes and far zone detection modes.

An object classification module 22 classifies objects in near zones and far zones based on zone detection module signals. An object tracking module 24 tracks objects based on object classification module signals. An estimation module 26 estimates a threat, such as a threat of impact, between the vehicle and an external object based on object tracking module signals and signals from a kinematics module 28. Kinematics module signals may indicate the position and direction of movement of the vehicle. The kinematics module 28 may communicate with the control module 12 through a wired or wireless control area network (CAN) of the vehicle.

A response module 30 responds to estimation module signals and determines various responses, if any, that vehicle systems will generate based on estimation module signals. The response module 30 may be overridden by an override module 32 controlled by a driver override device 34. The response module 30 may generate signals that control a parking notification module 36 such that the parking notification module 36 controls audible and/or visual indications to the driver. Such indications may include a visual display, such as parking display 38, a left mirror notification device 40, and/or a right near notification device 42. The notification devices may display an icon specific to a blind spot or proximity detection system. Such indications may also include audible devices, such as chimes or buzzers 41. The response module 30 may also respond to turns signals by activating side-specific visual or audio indications that may relate to the respective direction of travel for the vehicle.

Figure 2:
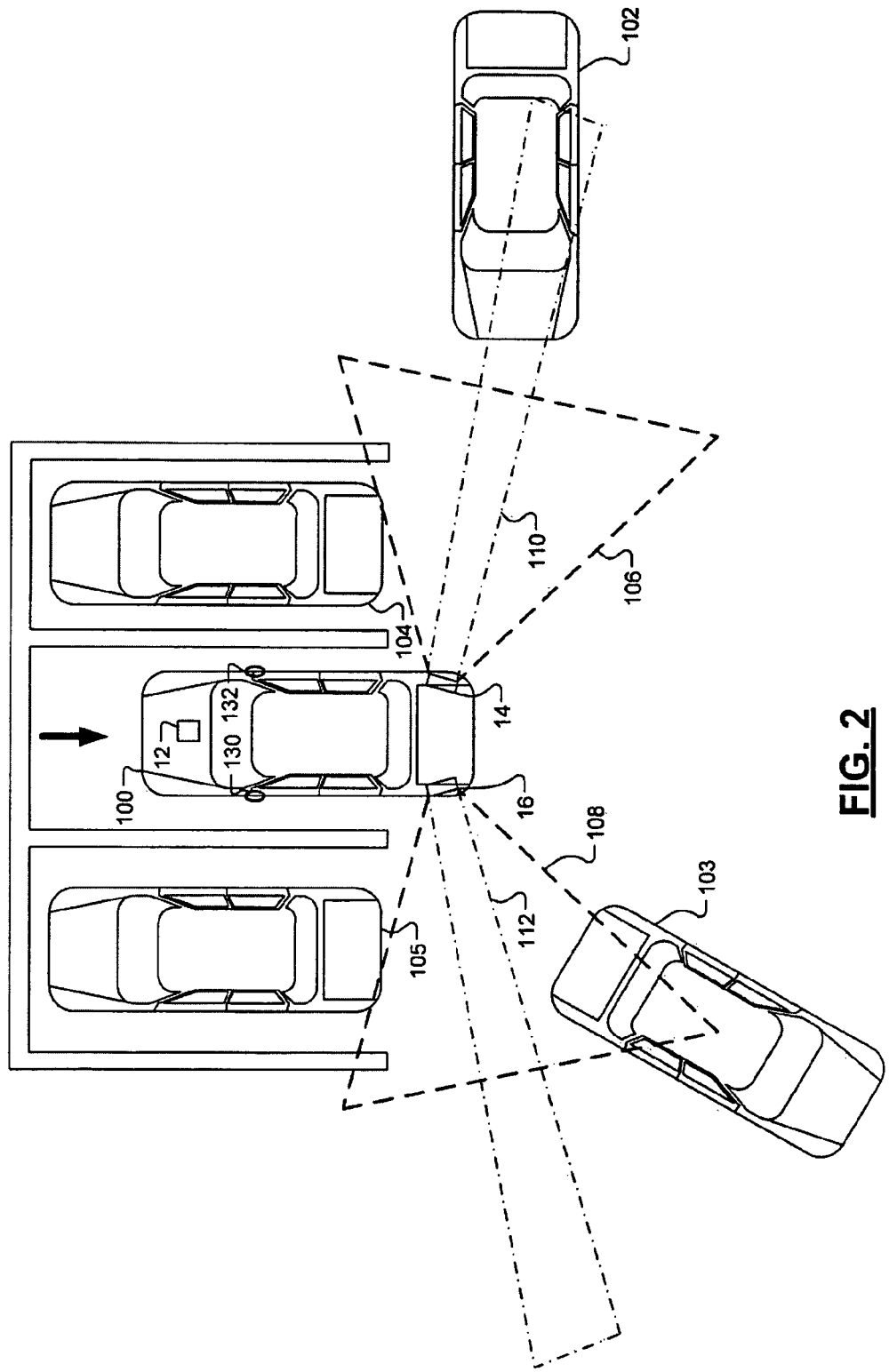
FIG. 2 is a schematic diagram illustrating operation of the proximity sensor system in accordance with the present disclosure.

Referring now to FIGS. 1 and 2, the vehicle proximity system 10, which may be a blind spot radar detection system, may operate when the vehicle 100 is in reverse. The system 10 alerts a driver to objects, such as vehicles 102, 103, 104, and 105 that are laterally positioned in relation to the vehicle 100 as the vehicle moves in a rearward motion. The sensors 14, 16 may detect objects in a broad pattern or field of view relative to a near zones 106, 108 of the vehicle 100. The sensors 14, 16 may also detect objects in more narrow but longer range far zones 110, 112. The sensors 14, 16 may be switched to either of these detection modes by the zone detection module 18. The remote sensors 14, 16, which may be radar, lidar or vision based sensors, may detect both position and speed of the detected objects that may be analyzed by the control module 12.

When the vehicle 100 is in reverse, the control module 12 may be switched to a rear cross path detection system wherein the zone detection module 18 switches between near and far zone detection. Objects, such as vehicles 102, 104, that meet an alert criteria within the response module 30 may trigger both the visual and/or audible alert to the driver.

The sensors 14, 16 detect stationary objects, such as vehicles 104, 105 and objects in motion such as vehicles 102, 103. The zone detection module 18 may first switch to a near zone detection mode, which may include a region near the vehicle (such as within 4 meters) as illustrated by near zones 106, 108. The near zones 106, 108 may cover a wide area, such as a 120° field of view of the sensors 14, 16.

The near zones 106, 108 may also be used to define a blind spot area when the vehicle 100 is in a forward motion. The control module 12 may visually alert the driver of all objects in the near zones 106, 108, stationary and moving. The sensors 14, 16 may detect the presence of garage structures, vehicles, trees, bicycles, shopping carts, humans, fire hydrants, boulders, toys, and other objects near the sides or rear of the vehicle 100 as the vehicle 100 moves rearward. All detected objects in the near zones 106, 108, regardless of size, moving or stationary, trigger a visual alert to the driver. Moving objects in the near zones 106, 108 may also trigger an audible alert.

When a moving object is detected, the zone detection module 18 may switch the sensors 14, 16 to far zone detection, including a narrower field of view than the near zones 106, 108, that may be up to, for example, 30 meters from the vehicle 100. When the system 10 is in the far zone detection mode, stationary objects that exist beyond the near zone limits may not generate a visual alert. This may effectively filter out parked cars, trees, and other objects that are detected but that will not interfere with rearward motion of the vehicle 100. If the sensors 14, 16 detect a moving object of any type in the far zone detection mode, that object may trigger a visual and an audible alert.

The rate of the moving object may be used by the estimation and response modules 26, 30 to determine the type of alert generated ranging from no alert, visual alert only, or visual and audible alert. No alert may be necessary if the moving object will not enter the rear cross path of the vehicle 100 within, for example, four second of an impact, based on the current position and speed of the vehicle 100. Once the moving object is determined to be within this short time frame (e.g., 4 seconds), the response module 30 may trigger a visual alert device.

The vehicle 100 may include left and right side mirrors 130, 132. Left and right mirror notification devices 40, 42 may generate icons that appear on the side mirrors 130, 132 to illustrate a threat and/or a degree of threat. An icon may appear on the mirrors 130, 132 on the side of the vehicle 100 corresponding to the detected object. If objects are detected on both sides of the vehicle 100, icons on both mirrors 130, 132 may be illuminated.

The vehicle 100 may also include the parking display 38 such that there is a redundant/secondary visual indication of an object in a rear cross path of the vehicle 100. A parking display 38, such as a Parksense or a Parktronics visual display, may display a series of light-emitting diodes (LEDs) that indicate to the driver how far the vehicle 100 is to objects off the rear bumper. The parking display 38 may also include arrow icons that illustrate which direction the object or threat is in relation to the vehicle 100. The parking display 38 may illuminate simultaneously with icons on side mirrors 130, 132, such that the driver may use side mirrors, rear view mirrors, or visual confirmation through glancing back through a rear window to determine threat and/or navigate the vehicle 100.

The response module may also trigger the chime 41 that may indicate relative threat to the vehicle based on estimation module and response module signals. During the chime and/or buzzer, the system 100 may mute a radio 150 and may provide a tone from either or both a chime 41 and a parking display 38.

There may be two conditions that trigger both a visual and an audible alert. If the system 10 senses a moving object in the far zones 110, 112 and the estimation module 26 determines that the approaching object will cross the path of the vehicle within a small amount of time, such as 1.5 seconds, both a visual and audible alert may be generated. These alerts may remain in effect until the object is no longer present or the object stops. If the object stops outside of a near zone threshold, such as 4 meters, both the visual and audible alerts may cease. If the object stops inside of the near zone, the audible alert may stop but the visual alert may continue. The remaining audible alert may indicate to the driver that cross traffic has either stopped to let the vehicle 100 out or has changed direction and is no longer a threat.

If the system 10 senses a moving object in the near zones 106, 108 and the estimation module 26 calculates that the object may cross the path of the vehicle within a predetermined short time frame, such as 1.5 seconds, both audible and visual alerts may remain in effect until the object stops or is no longer present. If the object stops and is still in on of the near zones 106, 108, the audible alert may stop but the visual alert may continue. The audible alert may indicate to the driver that the cross traffic has either stopped to let the vehicle out or changed direction and is no longer a threat.

Figure 3:
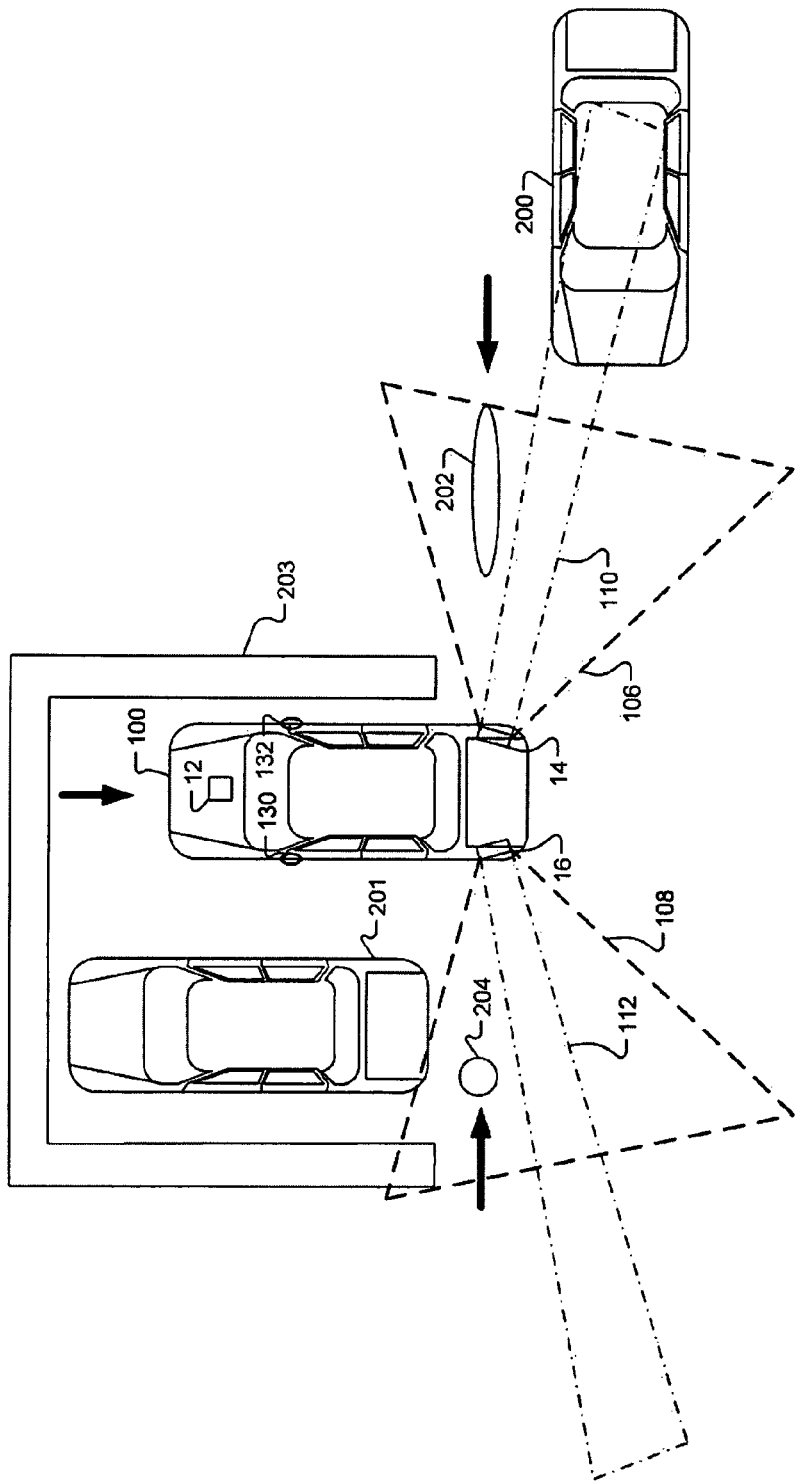
FIG. 3 is a schematic diagram illustrating operation of the proximity sensor system in accordance with the present disclosure.

Referring now to FIG. 3, the object tracking module 24 may track objects based on object classification module signals. The object classification module 22 may classify an object as for example, a moving vehicle 200, a parked vehicle 201, a bicycle 202, a garage 203, a pedestrian 204, or other object based on size determinations and/or other classification schemes. The estimation module 26 may estimation a threat to the vehicle 100 based on behavior of the objects, such as deceleration, stopping, and/or change of course.

Figure 4:
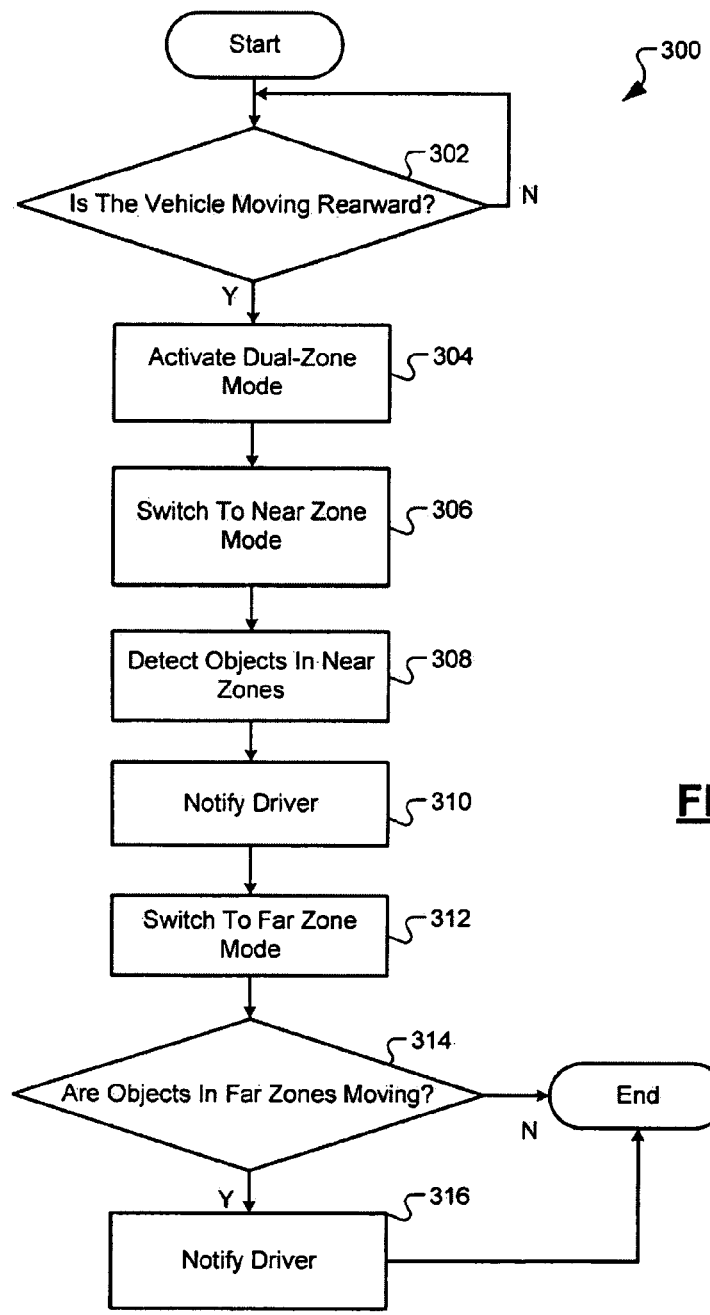
FIG. 4 is a block diagram illustrating a method for operating the proximity sensor system in accordance with the present disclosure.

Referring now to FIG. 4, a block diagram 300 illustrating a method for operating the proximity sensor system starts by determining that the vehicle is moving rearward in step 302. If step 302 is true, in step 304 the vehicle activates a dual zone mode. In step 306, remote sensors are switched to a near zone mode to detect stationary and moving objects close to the vehicle in step 308.

In step 310, the system notifies the driver of all objects in the near zone. In step 312, the system switches to a far zone mode to detect moving objects that are further away from the vehicle. In step 314 if objects are moving in the far zone that may cross paths with the vehicle, the driver is notified in step 316.

In operation, a remote sensor system control method for a vehicle includes moving the vehicle in a rearward direction. The method further includes switching first and second remote sensors from near zone detection to far zone detection. Near zone detection includes a wider field of view than far zone detection. Far zone detection detects areas more distant from the vehicle than near zone detection.

The method further includes tracking position information for first objects based on the near zone detection and tracking position information for second objects based on the far zone detection. The method also includes selectively responding to the second objects based on signals indicating that the second objects are moving toward the vehicle and responding to all of the first objects. The method includes generating a visual alert based on the first and second objects and generating an audible alert based on the first and second objects.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A proximity sensor system for a vehicle comprising:
   a zone detection module that switches a first remote sensor from a first mode corresponding to a near zone rearward of the vehicle to a second mode corresponding to a far zone rearward of the vehicle, wherein said near zone includes an area of coverage wider and shorter in range than an area of coverage of said far zone; and
   a response module that responds to first objects in said near zone and that selectively responds to second objects in said far zone when said second objects are in motion and that does not respond to said second objects when said second objects are stationary.

2. The system of claim 1 wherein said first remote sensor comprises at least one of a radar sensor, a lidar sensor, and a visual sensor.

3. The system of claim 1 wherein at least a number of said first objects correspond to a number of said second objects.

4. The system of claim 1 further comprising said first remote sensor, and
   a second remote sensor, wherein said zone detection module switches said second sensor between near and far zone detection.

5. The system of claim 1 further comprising an object tracking module that tracks position information for first objects in said near zone and second objects in said far zone.

6. The system of claim 5 further comprising an estimation module that estimates a threat of impact between the vehicle and at least one of said first objects and said second objects based on signals from said tracking module.

7. The system of claim 5 wherein said response module selectively responds to said second objects based on signals from said estimation module.

8. The system of claim 6 further comprising a kinematics module that generates position and angular direction signals of the vehicle, wherein said estimation module generates said threat of impact based on kinematics module signals.

9. The system of claim 8 further comprising a control area network communication bus, wherein said kinematics module communicates through said control area network communication bus.

10. The system of claim 1 further comprising a parking notification module that generates a notification signal based on response module signals.

11. The system of claim 10 further comprising left and right side mirror indicators that selectively display icons based on said notification signal indicating an event on at least one of left and right sides, of the vehicle.

12. The system of claim 10 further comprising a parking display that indicates a relative distance of the vehicle to said first and second objects based on said notification signal.

13. The system of claim 12 wherein said parking display comprises at least one of a Parksense visual display and Parktronics module.

14. The system of claim 10 further comprising an audible alert device that comprises at least one of a chime and a buzzer that activates based on response module signals.

15. The system of claim 14 further comprising a vehicle radio wherein said response module mutes said radio based on notification module signals indicating that said audible alert device will be activated.

16. The system of claim 1 further comprising an override module that overrides said response module.

17. A proximity sensor system for a vehicle in reverse comprising:
   a first remote sensor comprising a first near zone mode and a first far zone mode;
   a second remote sensor comprising a second near zone mode and a second far zone mode;
   a zone detection module that switches said first and second remote sensors from said first and second near zone modes to said first and second far zone modes as the vehicle moves in a rearward direction, wherein said first and second near zone modes cover areas rearward of the vehicle that have are wider and shorter in range than areas of coverage of said first and second far zone modes;
   an object tracking module that tracks position information for first objects in said first and second near zones and second objects in said first and second far zones;
   a response module that selectively responds to said second objects based on signals from said object tracking module indicating that said second objects are moving toward the vehicle and that does not respond to stationary second objects and that responds to all of said first objects;
   a visual alert device that activates based on response module signals; and
   an audible alert device that activates based on response module signals.

18. The system of claim 17 wherein said response module selectively responds to said second objects by activating both said visual alert device and said audible alert device based on said signals from said object tracking module indicating that at least one of said second objects will cross a path of the vehicle within a predetermined time threshold.

19. The system of claim 18 wherein said visual alert device remains active when said at least one of said second objects stops moving.

20. A control method for a remote sensor system for a vehicle comprising:

moving the vehicle in a rearward direction;

switching first and second remote sensors from near zone detection to far zone detection, wherein said near zone detection includes a wider field of view than said far zone detection and wherein said far zone detection detects areas more distant from the vehicle than said near zone detection;

tracking position information for first objects based on said near zone detection;

tracking position information for second objects based on said far zone detection;

selectively responding to said second objects based on signals indicating that said second objects are moving toward the vehicle and not responding to said second objects when said second objects are stationary;

responding to all of said first objects;

generating a visual alert based on said first and second objects; and generating an audible alert based on said first and second objects.

* * * * *